United States Patent
Lindberg

(10) Patent No.: US 7,415,774 B2
(45) Date of Patent: Aug. 26, 2008

(54) METHOD AND ARRANGEMENT FOR MEASURING THE POSITION OF A CIRCULAR OBJECT

(75) Inventor: Harri Lindberg, Järvenpää (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 11/794,189

(22) PCT Filed: Jan. 3, 2006

(86) PCT No.: PCT/FI2006/000005

§ 371 (c)(1), (2), (4) Date: Aug. 20, 2007

(87) PCT Pub. No.: WO2006/072658

PCT Pub. Date: Jul. 13, 2006

(65) Prior Publication Data

US 2008/0010844 A1    Jan. 17, 2008

(30) Foreign Application Priority Data

Jan. 4, 2005    (FI) .................................. 20050005

(51) Int. Cl.
*G01D 21/00* (2006.01)
*G01B 3/00* (2006.01)
(52) U.S. Cl. ............................. 33/520; 33/555.1; 33/644
(58) Field of Classification Search .................. 33/520, 33/501, 644, 555.1, 555, 549
See application file for complete search history.

(56) References Cited

U.S. PATENT DOCUMENTS

| 4,622,751 | A | | 11/1986 | Berg et al. | |
|---|---|---|---|---|---|
| 4,775,236 | A | * | 10/1988 | Cohen et al. | 356/640 |
| 5,157,265 | A | * | 10/1992 | Uomala | 250/559.24 |
| 5,376,805 | A | * | 12/1994 | Nieminen et al. | 250/559.26 |
| 5,926,781 | A | * | 7/1999 | Scott | 33/644 |
| 5,971,590 | A | | 10/1999 | Nieminen et al. | |
| 6,760,976 | B1 | | 7/2004 | Martinson et al. | |
| 7,234,244 | B2 | * | 6/2007 | Lindberg | 33/520 |
| 2006/0179673 | A1 | | 8/2006 | Lindberg | |

FOREIGN PATENT DOCUMENTS

| FI | 82985 | 1/1991 |
|---|---|---|
| FI | 93779 | 2/1995 |
| FI | 115001 | 2/2005 |
| WO | WO 2005/005258 A | 1/2005 |

\* cited by examiner

*Primary Examiner*—Yaritza Guadalupe-Mccall
(74) *Attorney, Agent, or Firm*—Cohen Pontani Lieberman & Pavane LLP

(57) ABSTRACT

Method and arrangement for measuring the position of the end shields of a paper, pulp, or board reel relative to the grab (1, 2) transporting it, when an end shield is attached to the grab (1, 2). During measurement, a detector (7) is moved along such a curve of a circle that can be assumed to intersect the curve of the circle described by the edge of the object. The angular position of the detector (7) is measured using the curve of the circle over which it travels and the intersection points (x1, z1; x2, z2) of the curve traveled by the detector (7) and the edge of the object are detected. The location of the center point (x0, z0) of the object is calculated on the basis of a) the radius of the circle traveled by the detector and the location (xm, zm) of the center point of the circle, b) the location (xt, zt) of the tool point, c) the assumed radius of the object, and d) the locations (x1, z1; x2 z2) of the detected intersection points. Finally, the position of the center point (x0, z0) of the object in the set of co-ordinates of the grab is calculated.

15 Claims, 5 Drawing Sheets

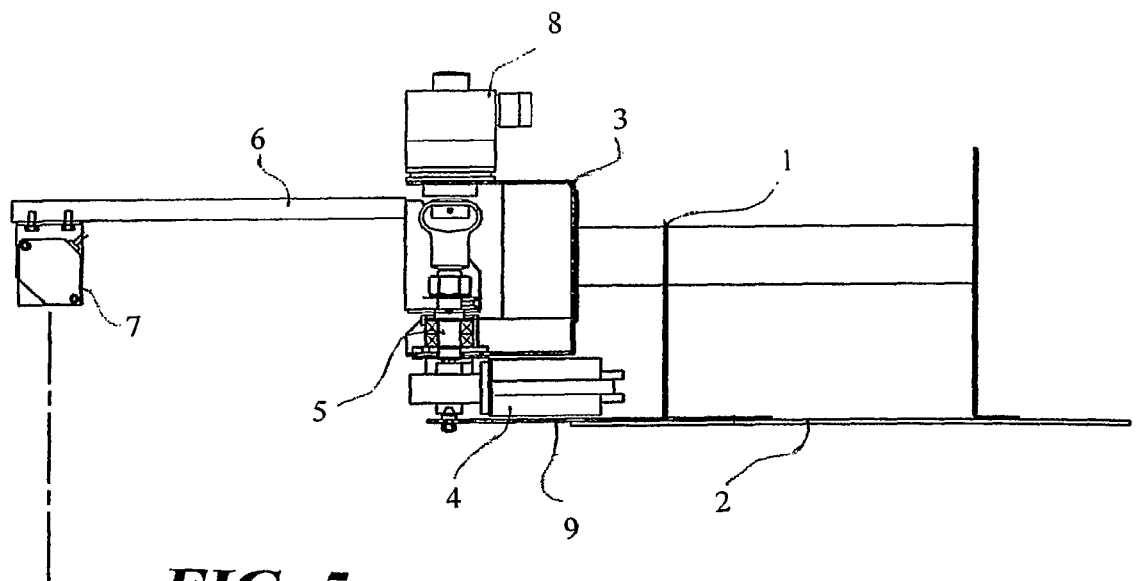
FIG. 5
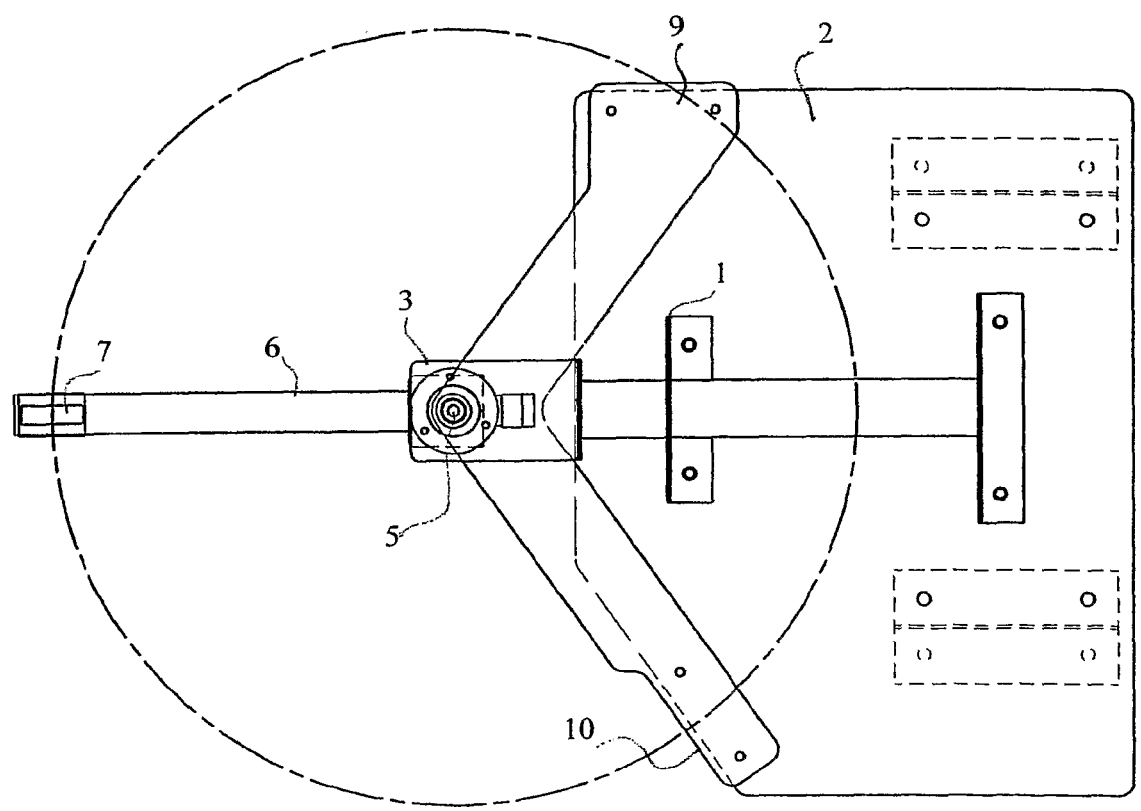

METHOD AND ARRANGEMENT FOR MEASURING THE POSITION OF A CIRCULAR OBJECT

PRIORITY CLAIM

This is a national stage of application No. PCT/FI2006/000005, filed on Jan. 3, 2006. Priority is claimed on application No. 20050005, filed in Finland on Jan. 4, 2005.

The present invention relates to a method, according to the preamble of claim 1, for determining the position of end shields used in packing paper, pulp, and board reels, or of the end of the reel.

The invention also relates to an arrangement intended to implement the method.

A wide paper reel coming from a paper machine is first of all taken to a slitter-winder and cut into customer reels of a suitable width. Next, the reels are packaged for transporting. When packaging paper reels, inner end shields are first of all placed on their ends, after which the necessary amount of wrapping is wrapped around them, the ends of which are folded on top of the inner end shields on the ends of the reels. An outer end shield is usually glued by hot sealing on top of the folded end of the wrapping and the inner end shield. The inner end shield is usually quite thick and its task is to protect the end of the reel from mechanical damage. For its part, the outer end shield is thinner and its task is to hold the packaging onto the end of the reel and to protect the reel from moisture. Colouring and patterns are often used on the outer end shield to try to give the reel a tidy appearance. The length and diameter of the reel to be packaged are measured prior to packaging and on the basis of the measurement results end shields of a suitable size are selected for the reel ends.

The end shields can be placed on the end of the reels in many different ways. Placing the shield by hand is the oldest method and one that is still suitable for packaging lines with a reasonably small capacity, or in installations in which there is no need to increase the degree of automation. The packer then simply places the inner shields by hand on the ends of the reel and the outer shields correspondingly on the heat-pressing plates, which press the outer shields onto the ends of the reel. The inner shields can also be transferred by an air blast or by hand without mechanical contact. The inner shields are held on the end of the reel on a separate arm while the edges of the wrapping are folded. The outer shields are, in turn, attached to the press plates by vacuum suction. When setting the shields by hand, the packer ensures that shields of the correct size are put on the reel and that they are positioned correctly.

Various kinds of automatic end-shield setters have already been used for a long time and several different kinds of them exist. Nearly all the automatic shield setters have the common feature that at each end of the reel there is a device comprising a grab, which transfers a shield from the stack of shields to the end of the reel. In one known shield setter, there is a rotating arm mounted on a vertical guide, at the end of which arm there is a rotating vacuum sucker for gripping the shields. Shield setters of this kind are normally used in conjunction with racks of shield shelves located next to the setter. Using such a device, the shields are placed on the end of the reel, in such a way that the arm of the grab is moved along the vertical guide to the height of the shelf on which there are end shields of the correct size. The grab arm and sucker are turned, until the sucker is aligned parallel to the plane of the shelf, after which the shield is picked up from the shelf and the arm and sucker are moved to the reel end by rotating them and moving them along the guide. In devices of this type, there is generally not a separate device for measuring the size and position of the end shields.

In another system, the end shield are placed in stacks on the mill floor and are transferred to the end of the reels using a portal-operation end-shield setter. The transfer portal is built above the stacks of shields while the shield setters are usually placed on the same transverse moveable guide. Thus each grab must have its own stack of end shields of a specific size. U.S. Pat. No. 5,157,265 discloses a method for determining the size and position of end shields, which is suitable for use in connection with the above system. In this measurement system, an end shield that is picked up by a grab is taken at a known speed past a pair of photocells, so that the arrival of the leading edge of the shield at the location of the cells and the passing of the trailing edge of the shield are detected on the basis of the changes in the signals of the photocells. The distances between the intersections can be calculated from the known speed of the shield and the difference between times of the changes in the signals. Because the shape of the shield is known, its position and size can now be determined. As the relation of the picking position of the grab to the shield stack is known, the real position of the shield stack can be determined from the shields position on the grab.

Instead of the aforementioned manner of handling end shields, a standard-model industrial robot with several degrees of freedom can be used to handle shields. A robot of this kind can be located in connection with a wrapping station, in such a way that it can place an end shield on both ends of the reel. The efficient operation of the robot requires a two-sided grab to be used, by means of which, by rotating the grab in between, shields for both ends can be picked up one after the other, so that two lifting movements will not be required. It is also possible to use two robots to achieve a short cycle time.

The method disclosed by U.S. Pat. No. 5,157,265 has, however, several weaknesses, on account of which it is not suitable for use in end-shield transfers taking place using a robot. Because a two-sided grab, in which the shields are on top of each other, must be used with the robot, the photocells will not be able to distinguish the shield at the edge of which the signal changes, so that this method cannot be applied when using a two-sided grab, unless the depth area of the detection is set for the photocells, so that they will detect only the desired shield of shields that are on top of each other. Because only two photocells are used in the method, it cannot be used to detect edge damage in a shield. If the damaged part of a shield lies on the path of the photocell, the size and position of the shield will be calculated wrongly and the shield may be rejected, even though it might in fact be entirely usable. The rejection of the shield is not a problem in itself, but after rejection a new shield must be fetched, which will of course disrupt the operation of the packing line. However, the shield is usually taken to be press plate and the operator is notified of an error, allowing the error to be corrected by eye or a new shield to be placed on the press plate. It is only possible to operate in this manner if the movements of the robot are kept sufficiently slow, while the correction of error situations greatly disrupts the operation of the packing line. The movements of the robot must be slowed to allow the position of the end shield to be read with sufficient accuracy. In the same way, in an error situation, it must be possible to stop the movement, so that the operator can enter the area of movement of the robot in safety. Thus, it is possible to operate in the manner described above even when using robot shield setting, but the greatest possible benefit will not, however, be gained from the robot, due to the necessarily slow speed of movement.

In addition, in this system the measured position of the shield is compared with the position of a reference point on the grab, the position of which is known the whole time on the basis of signals given by motion sensors. Thus the method cannot be applied when using industrial robots, as the rapid movements of a robot will prevent the position data of the robot from being continuously determined. The location of the reference point of the grab must, in the case of a robot, be determined in some other way than from the position data of the robot, because it is not worth slowing the robots motion during measurement to such an extent that the position data could be read.

Patent U.S. Pat. No. 5,376,805 discloses a method for determining the size and position of an end shield relative to the grab transporting the shield. The grab is moved by an industrial robot with several degrees of freedom and the measurement of the shield takes place in a separate measuring station. The measuring station has three photocells, past which the shield and the grab are moved. A detection element is fitted to the grab, with the aid of which the position of the tool point of the grab is determined when the grab passes the first detection element. The position and size of the shield are determined on the basis of the line segments that are obtained with the aid of the signals given by the detector from the edges of the shield. In this solution too, a separate measuring station is used, so that the transfer of the shield to the end of the reel is slow, or else a high-efficiency robot must be used, by means of which great acceleration and deceleration can be obtained. If the size of the shield is not defined, but is given to the system as initial data, only two photocells and two points will be needed to determine the position of the end shield.

In the packing system there may also be a need to determine the size and position of the end-shield stack, or the size or position of the end of the reel. Using a separate fixed measuring station the position of the end-shield stacks cannot, of course, be determined. The size of the reels is measured using separate measuring devices in connection with packing, but measurement using even these will succeed at only one measurement point. Thus, it would be necessary to create a manner of measuring, by means of which the position of the end-shield stacks and the diameters of the reels could be measured at several different points. In high-capacity packing systems, several end-shield stacks are required over a large area, so that the measuring device must be easily movable and and its position must be able to be determined accurately.

The invention is intended to create a method, with the aid of which the position and location of an end shield, a reel end, or any other circular object can be determined with the aid of a detector fitted directly the grab or other transferring device and a separate measuring station will not be needed.

The invention is based on an arm, the angular position of which around its shaft of rotation can be determined, and which is mounted at one end rotatably on a shaft, being fitted to the grab, other transfer device, or fixed station, which handles the end shield. The arm is rotated around its shaft, when its end passes the edge of the circular object and the moment of passing is registered by a photocell that is at the end of the arm. The size and position of the object can be calculated on the basis of angular position of the arm, because the length of the arm and the position of the shaft of rotation relative to the tool point are known.

More specifically, the method according to the invention is characterized by what is stated in the characterizing portion of claim 1.

The arrangement according to the invention is, in turn, characterized by what is stated in the charactering portion of claim 9.

Considerable advantages are gained with the aid of the invention.

The most important advantage of the invention is that the position of the end shield, the end-shield stack, or the reel can be determined, for example, with the aid of a measuring device in the grab of the robot in any area of movement whatever of the robot. The end shield need not be attached to the grab, instead the measurement can be made by moving the measuring device over an end-shield stack. The end shield need not be taken to a separate measuring station, thus eliminating one work stage in the transfer of the shield. Thus the transfer movement of the shield is substantially accelerated, thus permitting the capacity of the packing system to be increased or else a cheaper and slower robot or manipulator to be used to transfer the end shields. As a separate measuring station is not required, the floor space needed by the packing system is reduced and the path of movement of the grab can be designed more freely. This is advantageous when rebuilding packing systems in existing mill accommodation. Naturally, the price of the system is also lower, as one separate device can be eliminated. Because the same measuring device can be used for measuring both the position of the end shields and the size and position of the reel ends, the system can be further simplified.

In the following, the invention is examined in greater detail with the aid of the accompanying drawings.

FIG. 5 shows one device according to the invention.

Measurement of the position of end shields can be implemented with the aid of the invention, in such a way that the measuring device attached to the grab or other transfer device is brought close to the object being measured, the position of the end-shield stack or the reel end is measured, and the measurement result is transferred to be used by the system. The measurement can take place when the grab is stationary or when it is moving. In the actual measurement event, the measurement arm of a defined size is rotated in such a way that its free end passes over the edge of the shield or reel, when two measurement points are detected, one when the end of the arm moves outside the area of the shield or reel end and one when the arm returns again on top of the shield or reel end.

The calculation of the size and centre point of the shield takes place as follows. When the measuring device is taken close to the object being measured, i.e. on top of the end-shield stack or in front of the reel end, the object being measured is usually located slightly eccentrically relative to the tool point of the measuring device. The eccentricity is due, for example to inaccuracies in the location of the shield stack, or to the construction of the measuring device or transfer device, such as the grab, so that the centre point of the shield or reel end is always at a distance from the tool point during lifting. Once the location of the shaft of rotation of the measuring arm is known, as are the length and angle of the arm, the location of the centre of the object being measured can be calculated. For calculation, the end of the measuring arm and the intersection point of the edge of the object are defined in the set of co-ordinates of the measuring device.

Figure 1:
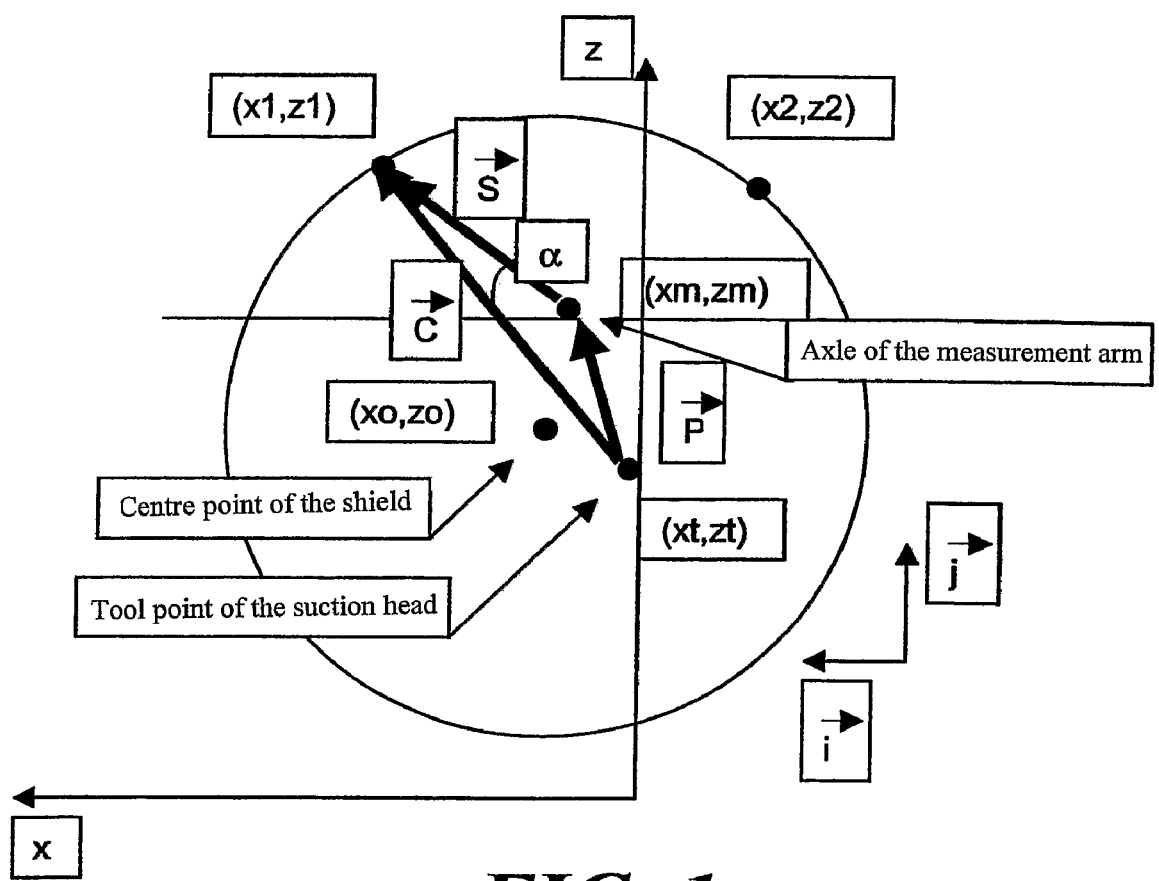
FIG. 1 is a schematic diagram of the measuring method according to the invention, in the first stage of the calculation.

The definition of the points (x1, z1) and (x2, z2) in the set of co-ordinates of the measuring device takes place according to FIG. 1. The angle a is obtained with the aid of an absolute sensor, which is connected to the shaft of the measuring arm. The absolute sensor is read at the moment when the sensor at the end of the arm, for example, a photocell, reacts. α is thus the measurement result and the location of the shaft of the measuring arm is always the same as the length of the measuring arm. With the aid of the angle α, the vector S of the shaft from the measuring arm to a point (x1, z1) on the edge of the object can now be defined. It can be seen from FIG. 1 that Vector C=P+S, so that by summing the now known vectors the location of the point (x1, z1) in the coordinates of the measuring device, i.e. relative to the tool point of the measuring device, is obtained.

In a corresponding manner, the co-ordinates of the point (x2, z2) are obtained. Once two points on the circumference of the circle have been defined, and the assumed radius of the object is known, the location of the centre point of the object is defined if additionally it is known on which side of the straight line running through the points the centre point is located.

Figure 2:
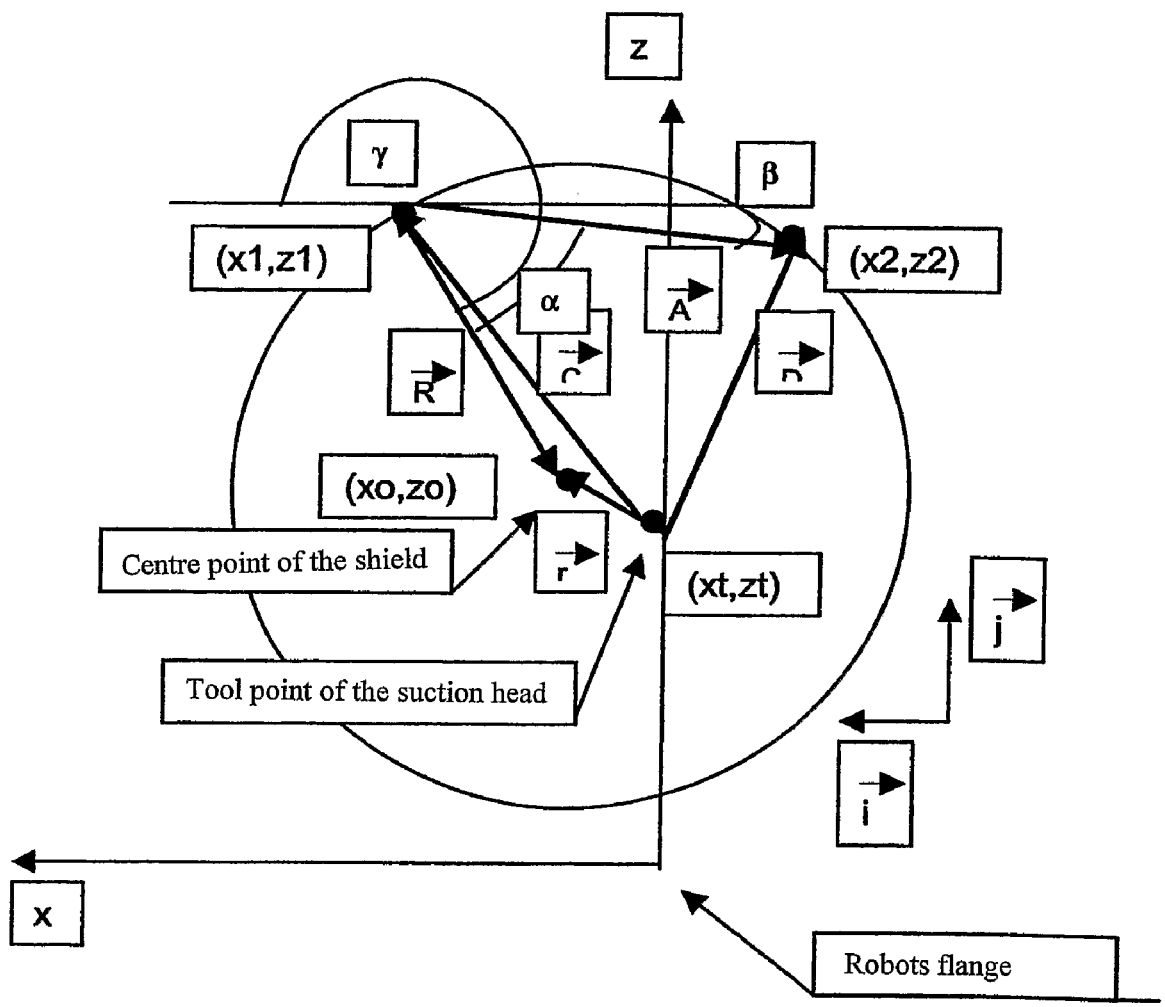
FIG. 2 is a schematic diagram of the measuring method according to the invention, in the second stage of the calculation.

After defining the points (x1, z1) and (x2, z2), the location of the centre point of the object in the set of co-ordinates of the suction head of the grab is calculated. This takes place according to FIG. 2.

Vector A is measured from the difference in the points. A=D−C. Vector R is obtained according to the figure with the aid of the angle $\gamma$ and $\gamma=180°+\alpha-\beta$. These angles can be defined with the aid of the previously determined points and known sectors and the radius of the object. Finally, the location of the centre point (x0, z0) relative to the tool point is defined, which is r=C+R.

Figure 3:
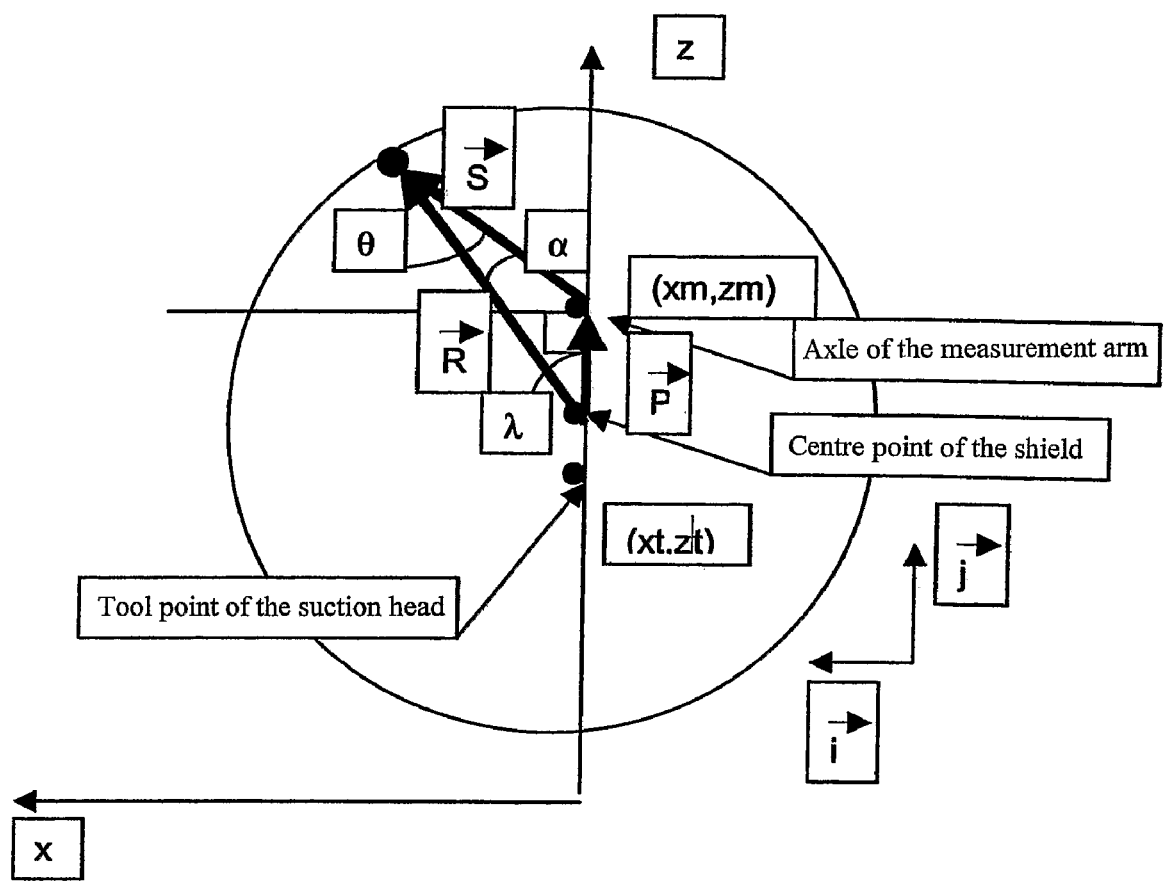
FIG. 3 is a schematic diagram of the measuring method according to the invention, in the third stage of the calculation.
Figure 4:
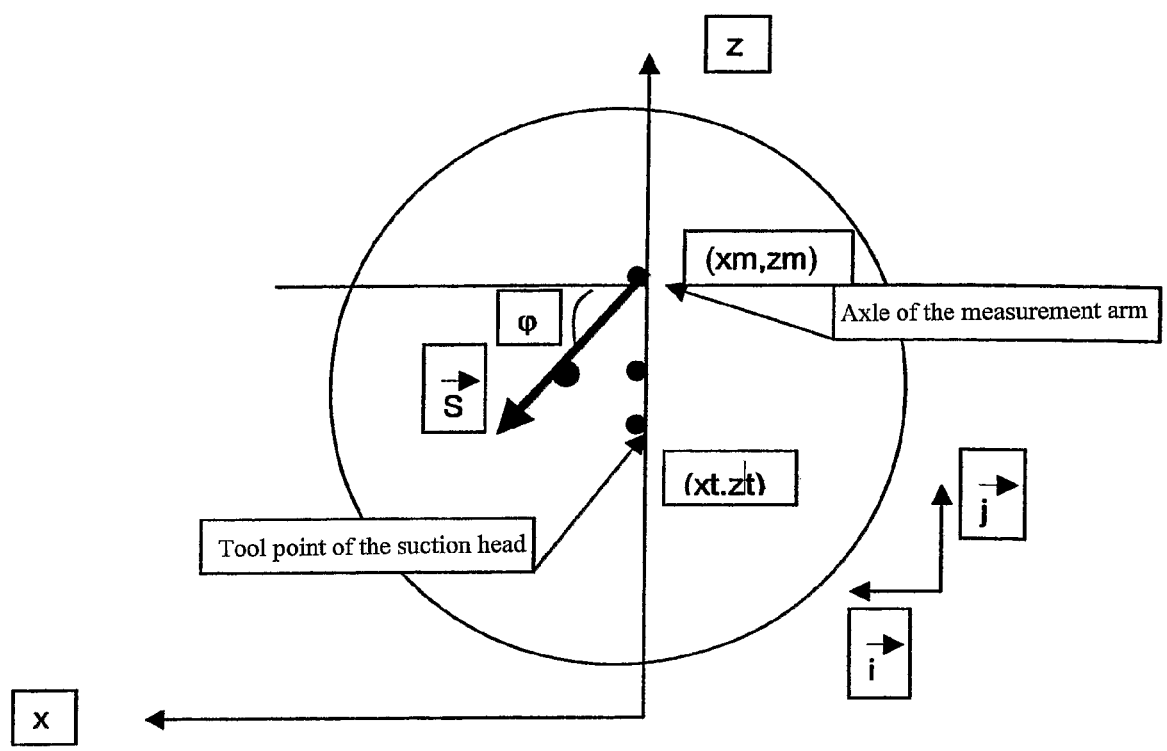
FIG. 4 is a schematic diagram of the measuring method according to the invention, in the fourth stage of the calculation.

The length of the measuring arm is calibrated using a calibration shield attached to the suction head or by shaping the suction head in such a way that a separate disc is not required. The calibration is necessary in order to obtain a precise reading after a break in operation or first installation. Possible calibration may thus be needed, for example, after the measuring device has collided with something, at regular intervals to check its operation, and naturally when the apparatus is installed, prior to its use in production. With the aid of a calibration shield, calibration takes place in such a way that the calibration shield is placed on the grab, its radius R being known exactly and the shield is set precisely in the desired position with the aid of guides. Its centre point is located on the z shaft in theoretically the correct place FIG. 3.

The length of the measuring arm is calibrated with the aid of a calibration shield fitted to the suction head. The measuring arm is rotated slowly clockwise, until the photocell reacts. The angle of the measuring arm is obtained from the absolute sensor according to FIG. 3. Another alternative is a calibration line in the suction head itself, at the location of which a corresponding reaction is obtained from the photocell.

The calibration shield is set in a precisely defined location, to that the vector P between the shield centre points and the shaft of the measuring arm is known and the vector R between the shield centre point and the detected point is obtained on the basis of the measured angle of rotation. Because the length of vector R is the radius of the shield, the specific value of vector S, i.e. the length of the measuring arm can be calculated with the aid of the angles $\alpha$, $\theta$, and $\lambda$.

If there is a cutaway face for calibration in the other extreme edge of the measuring device in the suction head of the grab, the calibration of the length of the measuring arm takes place as follows. The angle between the cutaway face and the measuring movement corresponds, for example, to the angle between the tangent of a 1000-mm shield and the tangent of the measuring movement. The cutaway face is installed or made in such a way that it is parallel to the Z axis and at a specified distance from it. Now, when the photocell is active, the value of the angle is measured. The precise length of the measuring arm can be determined with the aid of the distance of the Z axis of the angle cutaway face.

Because the angle value given by the measuring arm is utilized in the calibration of the measuring arm length described above, the angle value must be calibrated first. The angle of the measuring arm is calibrated by running the measuring arm counter-clockwise until the photocell reacts to the calibration cutaway face of the angle of the measuring arm. The cutaway face is installed in such a way that its edge forms a specific angle j with the shaft of the measuring arm. When the measuring arm is run to this angle, a correction factor is obtained for the reading of the absolute sensor, if the reading of the sensor differs from the set calibration value. For operation, the measuring-arm sensor is set programmatically to the angle j.

There is a slight delay in the detection of the edge of the object, which is due to the specific delay of the measuring equipment and the shape of the beam of the detector. This delay is eliminated using a constant placed in the calculation algorithm. The angle $\alpha$ obtained in the measurement of the length of the measuring arm is the 'real' angle of the location vector S of the point (x1, z1). In the calibration of the delay, the measuring movement is run normally and the detected angle are read. The results obtained are compared with the theoretical 'real' angle. The offset of the angle is obtained as the difference. The measurement is carried out for both the rising and sinking edge of the object.

FIG. 5 shows one device for applying the principle of the invention described above. Using this device, it is possible to measure the location of the end shield from a shield attached to the suction disc, or the grab can be moved, for example, over an end-shield stack and measure the location of the stack by lifting a shield from the stack onto the grab. The same device can also be used to measure the location of the end of a reel or the diameter of a reel anywhere in the area of movement of the grab. The device is fitted to the frame 1 of the grab, to which the suction plate 2 is also attached. The construction and operation of the suction plate 2 does not, as such, relate to this invention, so that it is not described in greater detail. The case 3 is also attached to the grab frame, while the shaft 5 of the measuring arm 6 is fitted to the case 3 and the frame 2. At the frame 2 end of the measuring arm 5 there is a geared motor 4, with the aid of which the shaft 5 is rotated. At the opposite end of the shaft 5 is the absolute sensor 8. The type and construction of the sensor do not, as such, affect the implementation of the invention, as long as it can be used to reliably detect the angle of rotation of the shaft. Alternatively, the sensor can be located in connection with the motor 4, or the angle can be read directly from the control of the stepped motor, or the sensor can be located at the side of the shaft, in which case there must be markings on the shaft, to which the sensor can react. The measuring arm 6 is attached to the shaft and at the end of the arm 6 there is the sensor 7. The sensor 7 can be, for example, a photocell based on fibre optics.

The case 3 is attached to the frame 1 of the grab and the suction plate with the aid of a V-shaped mounting plate 9. In this mounting plate 9, there is a cutaway face 10 for calibrating the angle of the measuring arm. Calibration takes place by turning the arm 6 in the direction of the cutaway face 10 until the sensor 7 detects the cutaway face. The cutaway face is formed as a cut in the outer edge of the mounting plate. In this way, the front edge of the cutaway face 10 is parallel to the straight line running through the centre point of the rotation shaft 5 and the angle of rotation can be expressed precisely, no matter at which point the radius of the detector 7 intersects the cutaway face. The length of the measuring arm 6 thus does not affect the measurement of the angle.

Correspondingly, the device can be fitted with a cutaway face intended for calibrating the length of the measuring arm 6. This cutaway face is arranged in the manner described in the sector concerning the calibration of the measuring arm 6.

The measuring device can be located in the grab or other transfer device or in a fixed position in a suitable place in the area of the packing machine. Thus an end shield can be taken in front of the detector for measurement. On a conveyor line, in which the reel is moved in a longitudinal direction, the measurement according to the invention can be used in such a way that, for example, the rotating or lowering arm takes the measuring device to the path of the reel. The end of a rolling reel can also be measured using the method according to the invention, but in that case the speed of the reel must be known. The essential part of the measurement is that the object being measured is located in the measuring area of the measuring device, by moving either the measuring device or the object.

Embodiments of the invention, differing from those disclosed above, can also be envisaged. In particular, the mechanical construction of the device described above can differ considerably from the above description. It is obvious that the construction of the device must be made to suit the construction of the grab being used. For example, the operating device of the rotating measuring arm 6, the device=s sensors, and the moving and static mechanical components can be shaped as desired, as long as it is possible to arrange in the device a detector travelling in a circular path and elements for measuring the angular position of the detector. The length of the measuring arm and the location of its rotating shaft can be selected as desired. The location of the rotating shaft should, however, be preferably at a distance from the tool point of the shield, to ensure that the circle of the rotation of the measuring arm will always intersect the circle of the edge of the shield. It can also be envisaged that several sensors are fitted to the measuring arm, in order to detect several intersection points, but this will usually be unnecessary and increase the price of the device, as well as demanding more calculating capacity.

What is claimed is:

1. A method for measuring the position of a circular object, such as the end or end shield of a paper or board reel, using a measuring device comprising:
    arranging positions of the measuring device and the circular object to be such that the object is in a detection area of the measuring device;
    moving the detector along such a circular path that intersects the curve of the circle described by the edge of the object;
    measuring with the measuring device an angular position of the detector using the curve of the circle over which the detector travels;
    detecting intersection points of the curve travelled by the detector and the edge of the object;
    determining a location of the centre point of the object on the basis of:
        a) the radius of the circular path travelled by the detector, and the location of the centre point of the circular path,
        b) the location of the tool point of a grab device for grasping the object,
        c) the assumed radius of the object, and
        d) the locations of the detected intersection points,
    determining the position of the centre point of the object in the set of coordinates of the grab device.

2. The method of claim 1, wherein the detector is transported on a measuring arm fitted to a first end of a rotation shaft and the shaft is used to measure the angle of rotation of the measuring arm.

3. The method of claim 2, wherein measurement of the angle of rotation of the measuring arm is calibrated by rotating the measuring arm towards a cutaway face at a defined rotation-angle position until the cutaway face is detected and the measurement of the angle of the measuring arm is set on the basis of this known angle.

4. The method of claim 2, wherein the length of the measuring arm is calibrated with the aid of a calibration end shield, the radius of which is precisely known and which is placed in a precisely defined location on the grab device.

5. The method of claim 4, wherein the length of the measuring arm is calibrated with the aid of a cutaway calibration face formed in the measuring device, at the location of which a measuring result corresponding to the calibration end shield is obtained.

6. The method of claim 1, wherein the measuring device is moved using a transfer device on top of an end-shield stack, and the location of the end-shield stack is measured.

7. The method of claim 1, wherein the measuring device is placed in a fixed position and an end shield is taken to the measuring device by the grab device for measurement.

8. The method of claim 1, wherein the measuring device is arranged relative to the path of travel of the reel in such a way that the end of the reel is located in the detection area of the measuring device at least momentarily and at least the diameter of the reel or the position of its end are measured.

9. An apparatus for measuring the position of a circular object, such as the end or end shield of a paper, pulp, or board reel, comprising:
    a frame structure;
    a grab device for grasping the object, the grab device having a defined tool point;
    a measuring device;
    a means for positioning the circular object and the measuring device such that the object is in a measuring area of the measuring device;
    a measuring arm arranged to rotate around a rotation shaft fitted to the frame structure, the measuring device measuring an angle of rotation of the measuring arm around the rotation shaft; and
    at least one detector fitted to the measuring arm to detect the edge of the end shield when the detector travels past the edge.

10. The apparatus of claim 9, wherein the rotation shaft of the measuring arm is at a distance from the tool point.

11. The apparatus of claim 9 further comprising a first calibration cutaway face parallel to a straight line running through the shaft of the measuring arm and to a defined angle position of the measuring arm.

12. The apparatus of claim 11, further comprising a second calibration cutaway face at a location in the rotation frame of the measuring arm such that at its location a corresponding detection of the edge of the end shield may be obtained.

13. The apparatus of claim 9, wherein the measuring device is moved by a robot or manipulator.

14. The apparatus of claim 9, wherein the measuring device is in a fixed position.

15. The apparatus of claim 9, wherein the measuring device can be moved to a position in which the reel travels through the measuring area of the measuring device.

* * * * *